United States Patent
Petrzilek et al.

(10) Patent No.: US 11,631,548 B2
(45) Date of Patent: Apr. 18, 2023

(54) SOLID ELECTROLYTIC CAPACITOR CONTAINING A MOISTURE BARRIER

(71) Applicant: AVX Corporation, Fountain Inn, SC (US)

(72) Inventors: Jan Petrzilek, Usti nad Orlici (CZ); Kiyofumi Aoki, Shiga Pref. (JP); Pavel Kucharczyk, Detmarovice (CZ)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 17/320,308

(22) Filed: May 14, 2021

(65) Prior Publication Data
US 2021/0383980 A1    Dec. 9, 2021

Related U.S. Application Data

(60) Provisional application No. 63/036,149, filed on Jun. 8, 2020.

(51) Int. Cl.
*H01G 9/028*    (2006.01)
*H01G 9/15*    (2006.01)
*H01G 9/052*    (2006.01)
*H01G 9/04*    (2006.01)

(52) U.S. Cl.
CPC .............. *H01G 9/028* (2013.01); *H01G 9/052* (2013.01); *H01G 9/15* (2013.01); *H01G 2009/05* (2013.01)

(58) Field of Classification Search
CPC .......... H01G 9/028; H01G 9/15; H01G 9/052; H01G 2009/05
See application file for complete search history.

(56) References Cited

U.S. PATENT DOCUMENTS

| | | |
|---|---|---|
| 3,889,357 A | 6/1975 | Millard et al. |
| 5,111,327 A | 5/1992 | Blohm et al. |
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,197,252 B1 | 3/2001 | Bishop et al. |
| 6,369,239 B2 | 4/2002 | Rauchschwalbe et al. |
| 6,430,032 B2 | 8/2002 | Sakai et al. |
| 6,430,033 B1 | 8/2002 | Mitsui et al. |

(Continued)

FOREIGN PATENT DOCUMENTS

| | | |
|---|---|---|
| CN | 102768903 A | 11/2012 |
| CN | 103854868 A | 6/2014 |

(Continued)

OTHER PUBLICATIONS

Merker et al., "New Conducting Polymer Dispersions for Solid Electrolyte Capacitors," *CARTS Europe 2005* (Prague, Czech Republic), Oct. 17-20, 2005, 6 pages.

(Continued)

*Primary Examiner* — David M Sinclair
(74) *Attorney, Agent, or Firm* — Dority & Manning, P.A.

(57) ABSTRACT

A solid electrolytic capacitor containing a capacitor element is provided. The capacitor element contains a sintered porous anode body, a dielectric that overlies the anode body, a solid electrolyte that overlies the dielectric, wherein the solid electrolyte includes a conductive polymer layer, and a moisture barrier that overlies the conductive polymer layer.

22 Claims, 1 Drawing Sheet

(56) References Cited

U.S. PATENT DOCUMENTS

| | | |
|---|---|---|
| 6,449,140 B1 | 9/2002 | Saki et al. |
| 6,528,662 B2 | 3/2003 | Jonas |
| 6,635,729 B1 | 10/2003 | Groenendaal et al. |
| 6,674,635 B1 | 1/2004 | Fife et al. |
| 6,771,488 B2 | 8/2004 | Takagi et al. |
| 6,805,816 B1 | 10/2004 | Groenendaal et al. |
| 6,891,016 B2 | 5/2005 | Reuter et al. |
| 6,987,663 B2 | 1/2006 | Merker et al. |
| 7,008,562 B2 | 3/2006 | Jonas et al. |
| 7,053,174 B2 | 5/2006 | Kirchmeyer et al. |
| 7,102,016 B2 | 9/2006 | Reuter |
| 7,118,690 B2 | 10/2006 | Wessling et al. |
| 7,154,740 B2 | 12/2006 | Merker et al. |
| 7,154,742 B1 | 12/2006 | Hahn et al. |
| 7,183,419 B2 | 2/2007 | Heuer et al. |
| 7,199,251 B2 | 4/2007 | Kirchmeyer et al. |
| 7,262,511 B2 | 8/2007 | Osako et al. |
| 7,288,663 B2 | 10/2007 | Kirchmeyer et al. |
| 7,341,801 B2 | 3/2008 | Reuter et al. |
| 7,358,326 B2 | 4/2008 | Heuer et al. |
| 7,363,511 B2 | 4/2008 | Kiiver |
| 7,377,947 B2 | 5/2008 | Merker et al. |
| 7,411,779 B2 | 8/2008 | Merker et al. |
| 7,449,588 B2 | 11/2008 | Jonas et al. |
| 7,497,879 B2 | 3/2009 | Kakuma et al. |
| 7,515,396 B2 | 4/2009 | Biler |
| 7,563,290 B2 | 7/2009 | Qiu et al. |
| 7,585,983 B2 | 9/2009 | Reuter et al. |
| 7,621,970 B2 | 11/2009 | Furusawa et al. |
| 7,649,730 B2 | 1/2010 | Jones et al. |
| 7,750,099 B2 | 7/2010 | Chikusa et al. |
| 7,771,621 B2 | 8/2010 | Kuramoto et al. |
| 7,785,493 B2 | 8/2010 | Jonas et al. |
| 7,859,829 B2 | 12/2010 | Kakuma et al. |
| 7,872,858 B2 | 1/2011 | Kakuma et al. |
| 7,923,475 B2 | 4/2011 | Jonas et al. |
| 7,938,866 B2 | 5/2011 | Biler |
| 7,938,986 B2 | 5/2011 | Elschner et al. |
| 7,951,901 B2 | 5/2011 | Reuter et al. |
| 7,972,534 B2 | 7/2011 | Merker et al. |
| 7,973,180 B2 | 7/2011 | Morita et al. |
| 7,990,683 B2 | 8/2011 | Qiu et al. |
| 7,990,684 B2 | 8/2011 | Sugihara et al. |
| 7,994,345 B2 | 8/2011 | Brassat et al. |
| 8,058,135 B2 | 11/2011 | Merker et al. |
| 8,090,548 B2 | 1/2012 | Abdennadher et al. |
| 8,125,768 B2 | 2/2012 | Horacek et al. |
| 8,174,596 B2 | 5/2012 | Wang et al. |
| 8,194,395 B2 | 6/2012 | Zenicek et al. |
| 8,195,490 B2 | 6/2012 | Tambe et al. |
| 8,224,681 B2 | 7/2012 | Tambe et al. |
| 8,300,387 B1 | 10/2012 | Zenickova et al. |
| 8,310,815 B2 | 11/2012 | Freeman et al. |
| 8,313,538 B2 | 11/2012 | Merker et al. |
| 8,323,361 B2 | 12/2012 | Freeman et al. |
| 8,334,331 B2 | 12/2012 | Elschner et al. |
| 8,364,511 B2 | 1/2013 | Tambe et al. |
| 8,379,372 B2 | 2/2013 | Zenicek et al. |
| 8,419,809 B2 | 4/2013 | Ishimaru |
| 8,420,671 B2 | 4/2013 | Reuter et al. |
| 8,426,542 B2 | 4/2013 | Sugihara et al. |
| 8,451,588 B2 | 5/2013 | Biler |
| 8,456,803 B2 | 6/2013 | Merker et al. |
| 8,462,484 B2 | 6/2013 | Kakuma et al. |
| 8,493,713 B2 | 7/2013 | Biler et al. |
| 8,535,812 B2 | 9/2013 | Totsuka et al. |
| 8,576,543 B2 | 11/2013 | Biler et al. |
| 8,592,520 B2 | 11/2013 | Kirchmeyer et al. |
| 8,663,505 B2 | 3/2014 | Loevenich et al. |
| 8,696,767 B2 | 4/2014 | Shibuya |
| 8,696,768 B2 | 4/2014 | Merker et al. |
| 8,699,208 B2 | 4/2014 | Merker et al. |
| 8,702,817 B2 | 4/2014 | Ishimaru |
| 8,721,928 B2 | 5/2014 | Jonas et al. |
| 8,721,929 B2 | 5/2014 | Loevenich et al. |
| 8,771,381 B2 | 7/2014 | Chen et al. |
| 8,808,403 B2 | 8/2014 | Qiu et al. |
| 8,824,121 B2 | 9/2014 | Biler et al. |
| 8,837,114 B2 | 9/2014 | Kamiyama et al. |
| 8,882,856 B2 | 11/2014 | Intelmann et al. |
| 8,902,567 B2 | 12/2014 | Chacko |
| 8,936,735 B2 | 1/2015 | Guntermann et al. |
| 8,940,191 B2 | 1/2015 | Nobuta et al. |
| 8,971,020 B2 | 3/2015 | Biler et al. |
| 9,030,807 B2 | 5/2015 | Chacko et al. |
| 9,034,211 B2 | 5/2015 | Megura et al. |
| 9,053,839 B2 | 6/2015 | Lövenich |
| 9,058,916 B2 | 6/2015 | Meguro et al. |
| 9,087,994 B2 | 7/2015 | Lövenich et al. |
| 9,111,680 B2 | 8/2015 | Intelmann et al. |
| 9,208,954 B2 | 12/2015 | Matsuura et al. |
| 9,236,191 B2 | 1/2016 | Chacko et al. |
| 9,236,192 B2 | 1/2016 | Biler et al. |
| 9,236,193 B2 | 1/2016 | Tatsuno et al. |
| 9,251,961 B2 | 2/2016 | Merker et al. |
| 9,287,051 B2 | 3/2016 | Aoyama et al. |
| 9,287,053 B2 | 3/2016 | Ishimaru |
| 9,296,921 B2 | 3/2016 | Okamoto et al. |
| 9,312,074 B2 | 4/2016 | Chacko et al. |
| 9,343,239 B2 | 5/2016 | Zhang et al. |
| 9,362,055 B2 | 6/2016 | Sugihara et al. |
| 9,373,448 B2 | 6/2016 | Majima et al. |
| 9,378,896 B2 | 6/2016 | Sugimura |
| 9,384,866 B2 | 7/2016 | Jibiki et al. |
| 9,406,445 B2 | 8/2016 | Petrzilek et al. |
| 9,455,092 B2 | 9/2016 | Sugawara et al. |
| 9,460,860 B2 | 10/2016 | Sugihara et al. |
| 9,466,432 B2 | 10/2016 | Aoyama et al. |
| 9,472,348 B2 | 10/2016 | Takatani et al. |
| 9,502,183 B2 | 11/2016 | Saulter et al. |
| 9,508,491 B2 | 11/2016 | Merker et al. |
| 9,514,888 B2 | 12/2016 | Merker et al. |
| 9,514,889 B2 | 12/2016 | Asteman et al. |
| 9,530,568 B2 | 12/2016 | Takatani et al. |
| 9,548,163 B2 | 1/2017 | Petrzilek et al. |
| 9,589,733 B2 | 3/2017 | Vilc et al. |
| 9,589,734 B2 | 3/2017 | Koseki et al. |
| 9,589,738 B2 | 3/2017 | Sugihara et al. |
| 9,595,396 B2 | 3/2017 | Matsuura et al. |
| 9,640,325 B2 | 5/2017 | Tagawa et al. |
| 9,672,989 B2 | 6/2017 | Uher et al. |
| 9,718,905 B2 | 8/2017 | Yano et al. |
| 9,754,697 B2 | 9/2017 | Onodera et al. |
| 9,756,697 B2 | 9/2017 | Odnoblyudov et al. |
| 9,761,347 B2 | 9/2017 | Shi et al. |
| 9,761,377 B2 | 9/2017 | Nobuta et al. |
| 9,761,378 B2 | 9/2017 | Shi et al. |
| 9,767,963 B2 | 9/2017 | Uher et al. |
| 9,779,881 B2 | 10/2017 | Ishimaru |
| 9,818,549 B2 | 11/2017 | Chacko |
| 9,875,852 B2 | 1/2018 | Asteman et al. |
| 9,892,859 B2 | 2/2018 | Takatani et al. |
| 9,905,368 B2 | 2/2018 | Djebara et al. |
| 9,928,964 B1 | 3/2018 | Jin et al. |
| 9,941,055 B2 | 4/2018 | Chacko et al. |
| 9,953,767 B2 | 4/2018 | Sugihara et al. |
| 9,959,981 B2 | 5/2018 | Merker et al. |
| 9,972,444 B2 | 5/2018 | Petrzilek et al. |
| 9,972,445 B2 | 5/2018 | Koseki et al. |
| 9,991,055 B2 | 6/2018 | Uher et al. |
| 10,014,016 B1 | 7/2018 | Mehfuz et al. |
| 10,026,521 B2 | 7/2018 | Scheel et al. |
| 10,049,822 B2 | 8/2018 | Sugihara et al. |
| 10,062,519 B2 | 8/2018 | Freeman et al. |
| 10,090,111 B2 | 10/2018 | Liu et al. |
| 10,109,421 B2 | 10/2018 | Chacko et al. |
| 10,109,427 B2 | 10/2018 | Ishikawa et al. |
| 10,109,428 B2 | 10/2018 | Shi et al. |
| 10,138,382 B2 | 11/2018 | Lovenich et al. |
| 10,147,551 B2 | 12/2018 | Intelmann et al. |
| 10,147,552 B2 | 12/2018 | Takatani et al. |
| 10,186,382 B2 | 1/2019 | Uher et al. |
| 10,208,160 B2 | 2/2019 | Sugihara et al. |
| 10,236,128 B2 | 3/2019 | Tsubaki et al. |

(56) References Cited

U.S. PATENT DOCUMENTS

| | | | |
|---|---|---|---|
| 10,242,799 B2 | 3/2019 | Chacko et al. | |
| 10,249,442 B2 | 4/2019 | Liu et al. | |
| 10,283,715 B2 | 5/2019 | Schumann et al. | |
| 10,340,091 B2 | 7/2019 | Bunha et al. | |
| 10,475,591 B2 | 11/2019 | Vilc et al. | |
| 10,504,657 B2 | 12/2019 | Vilc et al. | |
| 10,570,520 B2 | 2/2020 | Jin et al. | |
| 10,622,160 B2 | 4/2020 | Weaver et al. | |
| 10,650,980 B2 | 5/2020 | Bunha et al. | |
| 10,658,121 B2 | 5/2020 | Bunha et al. | |
| 10,741,333 B2 | 8/2020 | Nakata et al. | |
| 10,767,003 B2 | 9/2020 | Scheel et al. | |
| 10,770,238 B2 | 9/2020 | Djebara et al. | |
| 10,872,709 B2 | 12/2020 | Onodera | |
| 10,879,010 B2 | 12/2020 | Shi et al. | |
| 10,943,742 B2 | 3/2021 | Bunha et al. | |
| 10,975,200 B2 | 4/2021 | Onodera et al. | |
| 11,081,290 B2 | 8/2021 | Shi et al. | |
| 11,114,250 B2 | 9/2021 | Aoki et al. | |
| 11,170,942 B2 | 11/2021 | Nakata et al. | |
| 11,183,342 B2 | 11/2021 | Uher et al. | |
| 11,222,755 B2 | 1/2022 | Tezuka | |
| 11,257,628 B2 | 2/2022 | Petrzilek et al. | |
| 11,387,047 B2 | 7/2022 | Petrzilek et al. | |
| 11,404,220 B2 | 8/2022 | Navratil et al. | |
| 11,462,366 B2 | 10/2022 | Uher et al. | |
| 2002/0015279 A1* | 2/2002 | Sakai | H01G 9/15 361/523 |
| 2005/0013094 A1* | 1/2005 | Reuter | H01G 9/025 29/25.03 |
| 2005/0175861 A1 | 8/2005 | Elschner et al. | |
| 2005/0202274 A1 | 9/2005 | Elschner et al. | |
| 2009/0011226 A1 | 1/2009 | Takeuchi et al. | |
| 2009/0035532 A1 | 2/2009 | Bando et al. | |
| 2011/0019340 A1 | 1/2011 | Nobuto et al. | |
| 2011/0026190 A1 | 2/2011 | Oohata | |
| 2011/0190461 A1* | 8/2011 | Kita | C07D 495/04 548/518 |
| 2011/0233450 A1 | 9/2011 | Nobuta et al. | |
| 2013/0273514 A1 | 10/2013 | Tambe et al. | |
| 2013/0342967 A1 | 12/2013 | Lai et al. | |
| 2014/0145118 A1 | 5/2014 | Lovenich et al. | |
| 2015/0092319 A1* | 4/2015 | Tatsuno | H01G 9/028 361/525 |
| 2016/0104580 A1 | 4/2016 | Maeshima et al. | |
| 2017/0236647 A1 | 7/2017 | Intelmann et al. | |
| 2018/0047988 A1 | 2/2018 | Seuring et al. | |
| 2018/0108489 A1* | 4/2018 | Nakata | H01G 9/0036 |
| 2018/0137986 A1* | 5/2018 | Vilc | H01G 9/012 |
| 2018/0208713 A1* | 7/2018 | Scheel | H01G 9/0036 |
| 2018/0244838 A1* | 8/2018 | Miyamoto | C08L 65/00 |
| 2019/0006117 A1* | 1/2019 | Djebara | H01G 9/15 |
| 2019/0148080 A1 | 5/2019 | Fukui et al. | |
| 2019/0311857 A1 | 10/2019 | Bunha et al. | |
| 2019/0392995 A1 | 12/2019 | Navratil et al. | |
| 2019/0392998 A1 | 12/2019 | Petrzilek et al. | |
| 2020/0118766 A1* | 4/2020 | Miyamoto | H01G 9/028 |
| 2022/0220321 A1 | 7/2022 | Miyamoto | |

FOREIGN PATENT DOCUMENTS

| | | |
|---|---|---|
| CN | 104409213 | 3/2015 |
| CN | 105405657 A | 3/2016 |
| CN | 105405661 A | 3/2016 |
| CN | 105551801 B | 5/2016 |
| CN | 206040440 U | 3/2017 |
| EP | 0 384 694 | 8/1990 |
| EP | 1 100 097 B1 | 8/2008 |
| EP | 2 305 686 A1 | 4/2011 |
| EP | 2 695 904 | 2/2014 |
| EP | 3 318 589 A1 | 5/2018 |
| JP | H11274006 A | 10/1999 |
| JP | 2008311582 A | 12/2008 |
| JP | 2010129651 A | 6/2010 |
| JP | 2010153625 A | 7/2010 |
| JP | 2011009499 A | 1/2011 |
| JP | 2011009568 A | 1/2011 |
| JP | 2011009569 A | 1/2011 |
| JP | 2011114208 A | 6/2011 |
| JP | 2011135020 A | 7/2011 |
| JP | 2011195764 A | 10/2011 |
| JP | 2011199086 A | 10/2011 |
| JP | 2011199087 A | 10/2011 |
| JP | 2011199088 A | 10/2011 |
| JP | 2011216752 A | 10/2011 |
| JP | 2011253878 A | 12/2011 |
| JP | 2012015425 A | 1/2012 |
| JP | 2012025887 A | 2/2012 |
| JP | 2012049432 A | 3/2012 |
| JP | 2012174948 A | 9/2012 |
| JP | 2012188400 A | 10/2012 |
| JP | 2012191127 A | 10/2012 |
| JP | 2012199364 A | 10/2012 |
| JP | 2012244077 A | 12/2012 |
| JP | 2013006969 A | 1/2013 |
| JP | 2013055308 A | 3/2013 |
| JP | 2013074212 A | 4/2013 |
| JP | 2013116939 A | 6/2013 |
| JP | 2013127045 A | 6/2013 |
| JP | 2013163793 A | 8/2013 |
| JP | 2013251359 A | 12/2013 |
| JP | 2013251408 A | 12/2013 |
| JP | 2014003322 A | 1/2014 |
| JP | 2014007401 A | 1/2014 |
| JP | 2014011218 A | 1/2014 |
| JP | 2014011222 A | 1/2014 |
| JP | 2014024905 A | 2/2014 |
| JP | 2014027040 A | 2/2014 |
| JP | 2014041888 A | 3/2014 |
| JP | 2014043500 A | 3/2014 |
| JP | 2014060231 A | 4/2014 |
| JP | 2014093417 A | 5/2014 |
| JP | 2014135525 A | 7/2014 |
| JP | 2014198827 A | 10/2014 |
| JP | 2014201545 A | 10/2014 |
| JP | 5637544 B2 | 12/2014 |
| JP | 5663871 B2 | 2/2015 |
| JP | 2015021100 A | 2/2015 |
| JP | 2015095616 A | 5/2015 |
| JP | 2015105315 A | 6/2015 |
| JP | 2015118978 A | 6/2015 |
| JP | 5745881 B2 | 7/2015 |
| JP | 2015165550 A | 9/2015 |
| JP | 5807997 B2 | 11/2015 |
| JP | 2016009770 A | 1/2016 |
| JP | 5892535 B2 | 3/2016 |
| JP | 5911136 B2 | 4/2016 |
| JP | 5954798 B2 | 7/2016 |
| JP | 2016135839 A | 7/2016 |
| JP | 5988824 B2 | 9/2016 |
| JP | 5988831 B2 | 9/2016 |
| JP | 5998836 B2 | 9/2016 |
| JP | 6015243 B2 | 10/2016 |
| JP | 6015244 B2 | 10/2016 |
| JP | 6024264 B2 | 11/2016 |
| JP | 2016188348 A | 11/2016 |
| JP | 6096727 B2 | 3/2017 |
| JP | 2017045868 A | 3/2017 |
| JP | 2017048291 A | 3/2017 |
| JP | 2017057267 A | 3/2017 |
| JP | 2017095589 A | 6/2017 |
| JP | 2017101102 A | 6/2017 |
| JP | 6180010 B2 | 8/2017 |
| JP | 2017141409 A | 8/2017 |
| JP | 6201595 B2 | 9/2017 |
| JP | 2017171759 A | 9/2017 |
| JP | 2017188640 A | 10/2017 |
| JP | 6256970 B2 | 1/2018 |
| JP | 6273917 B2 | 2/2018 |
| JP | 6311355 B2 | 4/2018 |
| JP | 2018090755 A | 6/2018 |
| JP | 6379523 B2 | 8/2018 |
| JP | 2018123213 A | 8/2018 |

(56) References Cited

FOREIGN PATENT DOCUMENTS

| | | |
|---|---|---|
| JP | 6415146 B2 | 10/2018 |
| JP | 6427887 B2 | 11/2018 |
| JP | 2018184586 A | 11/2018 |
| JP | 2018193513 A | 12/2018 |
| JP | 2018204029 A | 12/2018 |
| JP | 6462255 B2 | 1/2019 |
| JP | 6485074 B2 | 3/2019 |
| WO | WO 2006/088033 A1 | 8/2006 |
| WO | WO 2008/036909 A2 | 3/2008 |
| WO | WO 2010/095650 A1 | 8/2010 |
| WO | WO 2010/095651 A1 | 8/2010 |
| WO | WO 2010/095652 A1 | 8/2010 |
| WO | WO 2012/014844 A1 | 2/2012 |
| WO | WO 2015119047 A1 | 8/2015 |
| WO | WO 2016/111277 A1 | 7/2016 |
| WO | WO-2016111277 A1 * 7/2016 ........... C07D 495/04 |
| WO | WO 2018/097085 A1 | 5/2018 |
| WO | WO 2019/026961 A1 | 2/2019 |
| WO | WO-2020129854 A1 * | 6/2020 |

OTHER PUBLICATIONS

Merker et al., "Conducting Polymer Dispersions for High-Capacitance Tantalum Capacitors," *CARTS Europe 2006*, 6 pages.

Safety Data Sheet for Selftron® S (Prototype) from Tosoh Corporation, Nov. 1, 2016, 9 pages.

Product Information on Self-doped Conductive Polymer TS-CP90 from Tosoh Corporation, 1 page.

Simpson et al., "Advances and Application of Inherently Conductive Polymer Technologies Based on Poly(3,4-Ethylenedioxythiophene)," *2005 AIMCAL Fall Technical Conference and 19th International Vacuum Web Coating Conference* (Myrtle Beach, SC), Oct. 16-20, 2005, Session 5: Advances in Technology, 10 pages.

Stéphan et al., "Electrochemical behavior of 3,4-ethylenedioxythiophene functionalized by a sulphate group. Application to the preparation of poly(3,4-ethylenedioxythophene) having permanent cation-exchange properties," *Journal of Electroanalytical Chemistry*, 443, 1998, pp. 217-226.

Tusy et al., "Synthesis and investigation of novel thiophene derivatives containing heteroatom linkers for solid state polymerization," *The Royal Society of Chemistry*, 2014, 4, pp. 8011-8014.

Ye et al., "Freestanding flexible polymer films based on bridging of two EDOT units with functionalized chains for use in long-term-stable capacitors," *New J. Chem.*, 2018, 42, pp. 4824-4834.

International Search Report and Written Opinion for PCT/US2021/033983 dated Oct. 28, 2021, 12 pages.

* cited by examiner

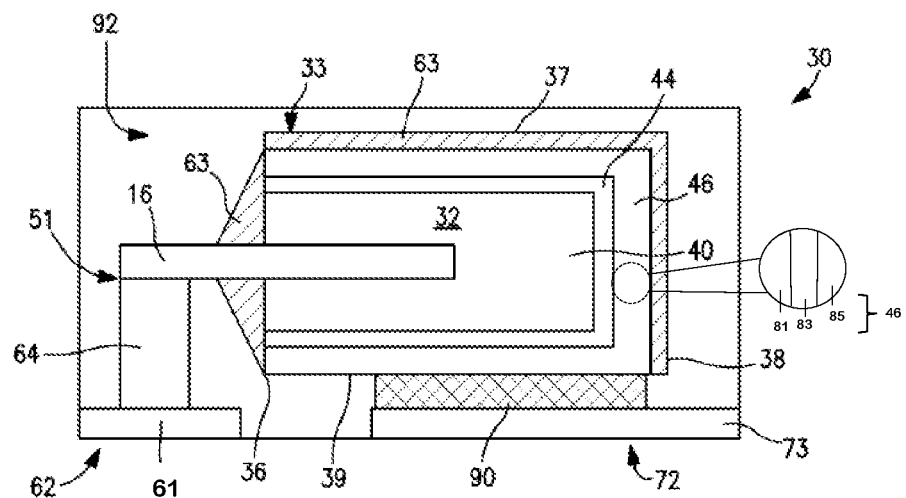

SOLID ELECTROLYTIC CAPACITOR CONTAINING A MOISTURE BARRIER

CROSS REFERENCE TO RELATED APPLICATION

The present application claims filing benefit of U.S. Provisional Patent Application Ser. No. 63/036,149 having a filing date of Jun. 8, 2020, which is incorporated herein by reference in its entirety.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. For example, such electrolytes can be formed through in situ chemical polymerization of a 3,4-dioxythiophene monomer ("EDOT") in the presence of a catalyst and dopant. However, conventional capacitors that employ in situ polymerized polymers tend to have a relatively high leakage current ("DCL") and fail at high voltages, such as experienced during a fast switch on or operational current spike. In an attempt to overcome these issues, dispersions have also been employed that are formed from a complex of poly(3,4-ethylenedioxythiophene) and poly(styrene sulfonic acid ("PEDOT:PSS"). While the PEDOT:PSS dispersions can result in some improved properties, the polymer tends to oxidize when exposed to humid environments (e.g., 85% relative humidity), thus decreasing the thermal stability of the capacitor.

As such, a need exists for an improved solid electrolytic capacitor that exhibits relatively stable electrical properties, particular under humid conditions.

SUMMARY OF THE INVENTION

In accordance with one embodiment of the present invention, a solid electrolytic capacitor is disclosed that contains a capacitor element. The capacitor element contains a sintered porous anode body, a dielectric that overlies the anode body, a solid electrolyte that overlies the dielectric, wherein the solid electrolyte includes a conductive polymer layer, and a moisture barrier that overlies the conductive polymer layer. The moisture barrier contains a conjugated polymer having a specific conductivity of about 0.1 S/cm or more. Further, after exposure to an atmosphere having a relative humidity of 60% and a temperature of 30° C. for 168 hours, the capacitor element absorbs only about 900 parts per million of water or less.

In accordance with another embodiment of the present invention, a solid electrolytic capacitor comprising a capacitor element is disclosed. The capacitor element comprises a sintered porous anode body, a dielectric that overlies the anode body, a solid electrolyte that overlies the dielectric, wherein the solid electrolyte includes a conductive polymer layer, a moisture barrier that overlies the conductive polymer layer. The moisture barrier contains a conjugated polymer having a specific conductivity of about 0.1 S/cm or more and that contains repeating thiophene units of the following general formula (1) and/or (2):

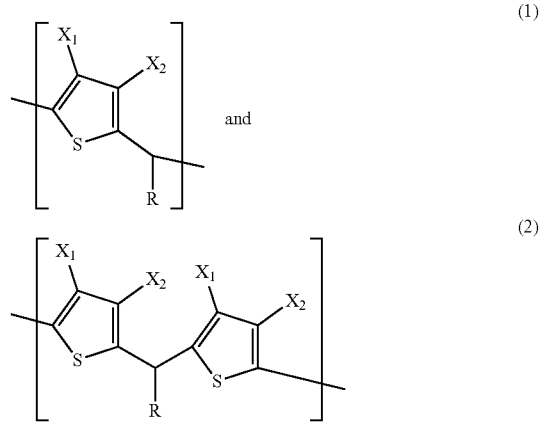

wherein, $X_1$ and $X_2$ are independently hydrogen, an optionally substituted alkyl (e.g., alkyl having 1 to 12 carbon atoms), optionally substituted alkoxy (e.g., alkoxy having 1 to 12 carbon atoms), optionally substituted alkylene oxide (e.g., having 1 to 12 carbon atoms), optionally substituted thiocyano, optionally substituted thioalkyl, or optionally substituted amino, or wherein $X_1$ and $X_2$ are combined to form an optionally substituted alkylenedioxy (e.g., having 1 to 12 carbon atoms) or an optionally substituted alkylenedithio group (e.g., having 1 to 12 carbon atoms); and R is an optionally substituted alkyl, optionally substituted alkoxy, optionally substituted alkylene oxide, optionally substituted heterocyclic group, or an optionally substituted aryl group.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a cross-sectional view of one embodiment of a capacitor of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains a capacitor element including a porous anode body, dielectric overlying the anode body, a solid electrolyte that contains at least one conductive polymer layer overlying the dielectric, and a moisture barrier overlying the conductive polymer layer. The moisture barrier includes a conjugated polymer that has a relatively high specific conductivity, in the dry state, of about 0.1 Siemen per centimeter ("S/cm") or more, in some embodiments about 0.5 S/cm or more, in some embodiments about 1 S/cm or more, in some embodiments about 2 S/cm or more, and in some embodiments, from about 5 to about 500 S/cm. In addition to being conductive, however, the conductive polymer is relatively hydrophobic in nature such that the resulting capacitor element may exhibit a low degree of water adsorption. More particularly, after exposure to an atmosphere having a relative humidity of 60% and a temperature of 30° C. for 168 hours, the capacitor element may absorb only about 900 parts per million ("ppm") or less, in some embodiments about 850 ppm or less, in some embodiments about 800 ppm or less, in some embodiments about 750 ppm or less, and in some embodiments, from about 1 to about 700 ppm of water. Likewise, the capacitor element may absorb about 150 μg of water or less, in some embodiments about 140 μg of water or less, and in some embodiments, from about 5 to about 130 μg of water per unit.

Without intending to be limited by theory, it is believed that the use of such a moisture barrier can help improve certain electrical properties of the resulting capacitor. The use of a conductive polymer within the moisture barrier may, for example, reduce equivalence series resistance ("ESR") over a wide variety of conditions, while minimizing the degree of moisture uptake by the capacitor element can likewise reduce leakage current ("DCL") and increase capacitance stability over a wide variety of conditions. For instance, after being subjected to an applied voltage (e.g., 120 volts) for a period of time from about 30 minutes to about 20 hours, in some embodiments from about 1 hour to about 18 hours, and in some embodiments, from about 4 hours to about 16 hours, the capacitor may exhibit a leakage current ("DCL") of only about 100 microamps ("μA") or less, in some embodiments about 70 pA or less, and in some embodiments, from about 1 to about 50 pA. Notably, the low DCL values can still remain stable even at high temperatures. For example, the capacitor may exhibit a DCL value within the ranges noted above even after being exposed to a temperature of from about 80° C. or more, in some embodiments from about 100° C. to about 180° C., and in some embodiments, from about 105° C. to about 150° C. (e.g., about 105° C., 125° C., or 150° C.) for a substantial period of time, such as for about 100 hours or more, in some embodiments from about 150 hours to about 3,000 hours, and in some embodiments, from about 200 hours to about 2,500 hours (e.g., 250, 500, 750, or 1,000 hours). In one embodiment, for example, the DCL of the capacitor after being exposed to a high temperature (e.g., about 105° C.) for 750 hours may be about 10 μA or less, in some embodiments about 5 μA or less, in some embodiments about 1 μA or less, in some embodiments about 0.8 μA or less, in some embodiments from about 0.5 μA or less, and in some embodiments, from about 0.01 to about 0.2 μA. Likewise, the ratio of the DCL of the capacitor after being exposed to a high temperature (e.g., about 105° C.) for 750 hours to the initial DCL of the capacitor (e.g., at about 23° C.) may be about 3.0 or less, in some embodiments about 2.0 or less, in some embodiments about 1.8 or less, in some embodiments about 1.6 or less, and in some embodiments, from about 0.9 to about 1.3.

The capacitor may also exhibit a relatively low equivalence series resistance ("ESR"), such as about 200 mohms, in some embodiments less than about 150 mohms, in some embodiments from about 0.01 to about 125 mohms, and in some embodiments, from about 0.1 to about 100 mohms, measured at an operating frequency of 100 kHz and temperature of 23° C. The capacitor may also exhibit a dry capacitance of about 30 nanoFarads per square centimeter ("nF/cm$^2$") or more, in some embodiments about 100 nF/cm$^2$ or more, in some embodiments from about 200 to about 3,000 nF/cm$^2$, and in some embodiments, from about 400 to about 2,000 nF/cm$^2$, measured at a frequency of 120 Hz at temperature of 23° C. Similar to the DCL values, the ESR and/or capacitance can also remain stable at the high temperature ranges noted above. In one embodiment, for example, the ratio of the ESR and/or capacitance value of the capacitor after being exposed to a high temperature (e.g., about 105° C.) for 750 hours to the initial ESR and/or capacitance value of the capacitor (e.g., at about 23° C.) may be about 3.0 or less, in some embodiments about 2.0 or less, in some embodiments about 1.8 or less, in some embodiments about 1.6 or less, and in some embodiments, from about 0.9 to about 1.3.

The capacitor may also exhibit an ESR, DCL, and/or capacitance value within the ranges noted above after being exposed to a high relative humidity level, either at room temperature or a high temperature (e.g., about 85° C.). Such high relative humidity levels may, for instance, be about 40% or more, in some embodiments about 45% or more, in some embodiments about 50% or more, and in some embodiments, about 70% or more (e.g., about 85% to 100%) for a substantial period of time as noted above. Relative humidity may, for instance, be determined in accordance with ASTM E337-02, Method A (2007). In one embodiment, for example, the ratio of the ESR, DCL, and/or capacitance value of the capacitor after being exposed to a high humidity level (e.g., about 85%) and high temperature (e.g., about 85° C.) for 1,000 hours to the initial ESR, DCL, and/or capacitance value of the capacitor (e.g., at about 23° C.) is about 2.0 or less, in some embodiments about 1.8 or less, in some embodiments about 1.6 or less, and in some embodiments, from about 0.9 to about 1.3.

Further, the capacitor may exhibit a high percentage of its wet capacitance, which enables it to have only a small capacitance loss and/or fluctuation in the presence of atmosphere humidity. This performance characteristic is quantified by the "wet-to-dry capacitance percentage", which is determined by the equation:

$$\text{Wet-to-Dry Capacitance} = (\text{Dry Capacitance}/\text{Wet Capacitance}) \times 100$$

The capacitor may exhibit a wet-to-dry capacitance percentage of about 50% or more, in some embodiments about 60% or more, in some embodiments about 70% or more, and in some embodiments, from about 80% to 100%.

It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor is typically about 250% or less, in some embodiments about 200% or less, and in some embodiments, from about 1% to about 180%, as determined at a frequency of 120 Hz. The capacitor may also be able to be employed in high voltage applications, such as at rated voltages of about 35 volts or more, in some embodiments about 50 volts or more, and in some embodiments, from about 60 volts to about 200 volts. The capacitor may, for example, exhibit a relatively high "breakdown voltage" (voltage at which the capacitor fails), such as about 60 volts or more, in some embodiments about 70 volts or more, in some embodiments about 80 volts or more, and in some embodiments, from about 100 volts to about 300 volts. Likewise, the capacitor may also be able to withstand relatively high surge currents, which is also common in high voltage applications. The peak surge current may be, for example, about 100 Amps or more, in some embodiments about 200 Amps or more, and in some embodiments, and in some embodiments, from about 300 Amps to about 800 Amps.

Various embodiments of the capacitor will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluorotantalate ($K_2TaF_7$), sodium fluorotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen).

Additional details of such a reduction reaction may be described in WO 2014/199480 to Maeshima, et al. After the reduction, the product may be cooled, crushed, and washed to form a powder.

The specific charge of the powder typically varies from about 2,000 to about 600,000 microFarads*Volts per gram ("µF*V/g") depending on the desired application. For instance, in certain embodiments, a high charge powder may be employed that has a specific charge of from about 100,000 to about 600,000 µF*V/g, in some embodiments from about 120,000 to about 500,000 µF*V/g, and in some embodiments, from about 150,000 to about 400,000 µF*V/g. In other embodiments, a low charge powder may be employed that has a specific charge of from about 2,000 to about 100,000 µF*V/g, in some embodiments from about 5,000 to about 80,000 µF*V/g, and in some embodiments, from about 10,000 to about 70,000 µF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadienelstyrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, micro-waxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead to the anode body may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1800° C., in some embodiments from about 800° C. to about 1700° C., and in some embodiments, from about 900° C. to about 1400° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. As indicated above, the dielectric is formed by anodically oxidizing ("anodizing") the sintered anode so that a dielectric layer is formed over and/or within the anode. For example, a tantalum (Ta) anode may be anodized to tantalum pentoxide ($Ta_2O_5$).

Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); glycols (e.g., ethylene glycol, propylene glycol, etc.); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent(s) may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, an ionic compound is generally employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

To form the dielectric, a current is typically passed through the electrolyte while it is in contact with the anode body. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process may be employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, the electrolyte employed during at least one stage of the dielectric development process contains an ionic compound as explained above. In one particular embodiment, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an ionic compound that is an acid, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage may likewise contain an ionic compound that is a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Pre-Coat

If desired, an optional pre-coat may be employed that overlies the dielectric and positioned between the dielectric and a conductive polymer layer of the solid electrolyte. The pre-coat may include an organometallic compound, such as a compound having the following general formula (V):

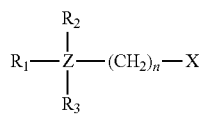

(V)

wherein,

Z is an organometallic atom, such as silicon, titanium, and so forth;

$R_1$, $R_2$, and $R_3$ are independently an alkyl (e.g., methyl, ethyl, propyl, etc.) or a hydroxyalkyl (e.g., hydroxymethyl, hydroxyethyl, hydroxypropyl, etc.), wherein at least one of $R_1$, $R_2$, and $R_3$ is a hydroxyalkyl;

n is an integer from 0 to 8, in some embodiments from 1 to 6, and in some embodiments, from 2 to 4 (e.g., 3); and X is an organic or inorganic functional group, such as glycidyl, glycidyloxy, mercapto, amino, vinyl, etc.

In certain embodiments, $R_1$, $R_2$, and $R_3$ in Formula (V) may be a hydroxyalkyl (e.g., $OCH_3$). In other embodiments, however, $R_1$ may be an alkyl (e.g., $CH_3$) and $R_2$ and $R_3$ may a hydroxyalkyl (e.g., OCH).

Further, in certain embodiments, Z in Formula (V) may be silicon so that the organometallic compound is an organosilane compound, such as an alkoxysilane. Suitable alkoxysilanes may include, for instance, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, glycidoxymethyltrimethoxysilane, glycidoxymethyltriethoxysilane, glycidoxymethyltripropoxysilane, glycidoxymethyltributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyltriethoxysilane, α-glycidoxyethyltripropoxysilane, α-glycidoxyethyltributoxysilane, γ-glycidoxypropyl-trimethoxysilane, γ-glycidoxypropyltriethoxysilane, γ-glycidoxypropyl-tripropoxysilane, γ-glycidoxypropyltributoxysilane, β-glycidoxypropyltrimethoxysilane, β-glycidoxypropyl-triethoxysilane, β-glycidoxypropyltripropoxysilane, α-glycidoxypropyltributoxysilane, α-glycidoxypropyltrimethoxysilane, α-glycidoxypropyltriethoxysilane, α-glycidoxypropyl-tripropoxysilane, α-glycidoxypropyltributoxysilane, γ-glycidoxybutyltrimethoxysilane, δ-glycidoxybutyltriethoxysilane, δ-glycidoxybutyltripropoxysilane, δ-glycidoxybutyl-tributoxysilane, δ-glycidoxybutyltrimethoxysilane, γ-glycidoxybutyltriethoxysilane, γ-glycidoxybutyltripropoxysilane, γ-propoxybutyltributoxysilane, δ-glycidoxybutyl-trimethoxysilane, δ-glycidoxybutyltriethoxysilane, δ-glycidoxybutyl-tripropoxysilane, α-glycidoxybutyltrimethoxysilane, α-glycidoxybutyltriethoxysilane, α-glycidoxybutyl-tripropoxysilane, α-glycidoxybutyltributoxysilane, (3,4-epoxycyclohexyl)-methyl-trimethoxysilane, (3,4-epoxycyclohexyl)methyl-triethoxysilane, (3,4-epoxycyclohexyl)methyltripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyl-tripropoxysilane, (3,4-epoxycyclohexyl)propyltributoxysilane, (3,4-epoxycyclohexyl)butyltrimethoxysilane, (3,4-epoxycyclohexy) butyltriethoxysilane, (3,4-epoxycyclohexyl)butyltripropoxysilane, (3,4-epoxycyclohexyl)butyltributoxysilane, and so forth.

The particular manner in which the pre-coat is applied to the capacitor body may vary as desired. In one particular embodiment, the compound is dissolved in an organic solvent and applied to the part as a solution, such as by screen-printing, dipping, electrophoretic coating, spraying, etc. The organic solvent may vary, but is typically an alcohol, such as methanol, ethanol, etc. Organometallic compounds may constitute from about 0.1 wt. % to about 10 wt. %, in some embodiments from about 0.2 wt. % to about 8 wt. %, and in some embodiments, from about 0.5 wt. % to about 5 wt. % of the solution. Solvents may likewise constitute from about 90 wt. % to about 99.9 wt. %, in some embodiments from about 92 wt. % to about 99.8 wt. %, and in some embodiments, from about 95 wt. % to about 99.5 wt. % of the solution. Once applied, the part may then be dried to remove the solvent therefrom and form a pre-coat layer containing the organometallic compound.

D. Solid Electrolyte

A solid electrolyte overlies the dielectric and optional pre-coat. The total thickness of the solid electrolyte is typically from about 1 to about 50 μm, and in some embodiments, from about 5 to about 20 μm. The solid electrolyte may contain one or layers of a conductive polymer, such as polypyrroles, polythiophenes, polyanilines, etc. Thiophene polymers are particularly suitable for use in the solid electrolyte. In certain embodiments, for instance, a thiophene polymer may be employed that has repeating units of the following formula (I):

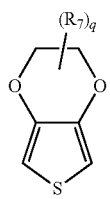

(I)

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0.

Intrinsically and/or extrinsically conductive polymers may be employed in the solid electrolyte. "Extrinsically" conductive polymers, for instance, typically require the presence of a separate counterion that is not covalently bound to the polymer. One example of such an extrinsically conductive polymer is poly(3,4-ethylenedioxythiophene). The counterion may be a monomeric or polymeric anion that counteracts the charge of the conductive polymer. Polymeric anions can, for example, be anions derived from polymeric carboxylic acids (e.g., poly(meth)acrylic acids, such as poly-2-sulfoethyl(meth)acrylate or poly-3-propylsulfo (meth)acrylate; polymaleic acids; etc.); polymeric sulfonic acids (e.g., polystyrene sulfonic acids ("PSS"), polyvinyl sulfonic acids, etc.); and so forth, as well as salts thereof, such as an alkali metal, alkaline earth metal, transition metal, or ammonium salt thereof. Likewise, suitable monomeric anions may be derived from $C_1$ to $C_{20}$ alkane sulfonic acids (e.g., dodecane sulfonic acid); aliphatic fluorosulfonic acids (e.g., trifluoromethane sulfonic acid, perfluorobutane sulfonic acid, perfluorooctane sulfonic acid, trifluoromethanesulfonimide, etc.); aliphatic $C_1$ to $C_{20}$ carboxylic acids (e.g., 2-ethyl-hexylcarboxylic acid); aliphatic fluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); cycloalkane sulfonic acids (e.g., camphor sulfonic acid); boronic compounds (e.g., tetrafluoroboric acid); phosphoric compounds (e.g., hexafluorophosphoric acid); and so forth, as well as salts thereof, such as an alkali metal, alkaline earth metal, transition metal, or ammonium salt thereof. Particularly suitable counteranions are polymeric anions, such as those derived from a polymeric carboxylic or sulfonic acid (e.g., polystyrene sulfonic acid ("PSS")). The molecular weight of such compounds typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. Such polymers may, for example, have a relatively high specific conductivity, in the dry state, of about 1 Siemen per centimeter ("S/cm") or more, in some embodiments about 10 S/cm or more, in some embodiments about 25 S/cm or more, in some embodiments about 40 S/cm or more, and in some embodiments, from about 50 to about 500 S/cm. One example of a suitable intrinsically conductive thiophene polymer may have repeating units of the following formula (II):

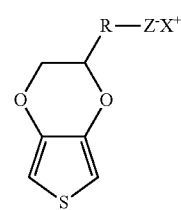

(II)

wherein,

R is $(CH_2)_a$—O—$(CH_2)_b$-L, where L is a bond or $HC([CH_2]_cH)$;

a is from 0 to 10, in some embodiments from 0 to 6, and in some embodiments, from 1 to 4 (e.g., 1);

b is from 1 to 18, in some embodiments from 1 to 10, and in some embodiments, from 2 to 6 (e.g., 2, 3, 4, or 5);

c is from 0 to 10, in some embodiments from 0 to 6, and in some embodiments, from 1 to 4 (e.g., 1);

Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;

X is a cation, such as hydrogen, an alkali metal (e.g., lithium, sodium, rubidium, cesium or potassium), ammonium, etc.

In one particular embodiment, Z in formula (II) is a sulfonate ion such that the intrinsically conductive polymer contains repeating units of the following formula (III):

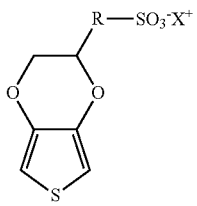

(III)

wherein, R and X are defined above. In formula (II) or (III), a is preferably 1 and b is preferably 3 or 4. Likewise, X is preferably sodium or potassium.

If desired, the polymer may be a copolymer that contains other types of repeating units. In such embodiments, the repeating units of formula (II) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (II). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

In another embodiment, the intrinsically conductive polymer has repeating thiophene units of the following general formula (IV):

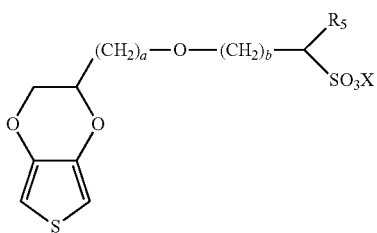

(IV)

wherein,
a and b are as defined above;
$R_5$ is an optionally substituted $C_1$-$C_6$ linear or branched alkyl group (e.g., methyl) or a halogen atom (e.g., fluorine);
X is a hydrogen atom, an alkali metal (e.g., Li, Na, or K), $NH(R^1)_3$, or $HNC_5H_5$, wherein $R^1$ is each independently a hydrogen atom or an optionally substituted $C_1$-$C_6$ alkyl group.

Specific examples of thiophene compounds used to form such repeating are described in U.S. Pat. No. 9,718,905 and may include, for instance, sodium 3-[(2,3-dihydrothieno[3,4-b][1,4]dioxin-2-yl)methoxy]-1-methyl-1-propane-sulfonate, sodium 3-[(2,3-dihydrothieno[3,4-b]-[1,4]dioxin-2-yl)methoxy]-1-ethyl-1-propanesulfonate, sodium 3-[(2,3-dihydrothieno[3,4-b]-[1,4]dioxin-2-yl)methoxy]-1-propyl-1-propane- sulfonate, sodium 3-[(2,3-dihydrothieno[3,4-b]-[1,4]dioxin-2-yl)methoxy]-1-butyl-1-propanesulfonate, sodium 3-[(2,3-dihydrothieno[3,4-b]-[1,4]dioxin-2-yl) methoxy]-1-pentyl-1-propane- sulfonate, sodium 3-[(2,3-dihydrothieno[3,4-b]-[1,4]dioxin-2-yl)methoxy]-1-hexyl-1-propanesulfonate, sodium 3-[(2,3-dihydrothieno[3,4-b]-[1,4]dioxin-2-yl)methoxy]-1-isopropyl-1-propanesulfonate, sodium 3-[(2,3-dihydrothieno[3,4-b]-[1,4]dioxin-2-yl)methoxy]-1-isobutyl-1-propanesulfonate, sodium 3-[(2,3-dihydrothieno[3,4-b]-[1,4]dioxin-2-yl)methoxy]-1-isopentyl-1-propanesulfonate, sodium 3-[(2,3-dihydrothieno[3,4-b]-[1,4]dioxin-2-yl)methoxy]-1-fluoro-1-propanesulfonate, potassium 3-[(2,3-dihydrothieno[3,4-b]-[1,4]dioxin-2-yl) methoxy]-1-methyl-1-propanesulfonate, 3-[(2,3-dihydrothieno[3,4-b]-[1,4]dioxin-2-yl)methoxy]-1-methyl-1-propanesulfonic acid, ammonium 3-[(2,3-dihydrothieno[3,4-b]-[1,4]dioxin-2-yl)methoxy]-1-methyl-1-propane- sulfonate, triethylammonium 3-[(2,3-dihydrothieno[3,4-b]-[1,4]dioxin-2-yl)methoxy]-1-methyl-1-propanesulfonate, etc., as well as combination thereof. Each of the above exemplified thiophene monomers may be prepared from thieno[3,4-b]-1,4-dioxin-2-methanol and a branched sultone compound in accordance with a known method (e.g., Journal of Electroanalytical Chemistry, 443, 217 to 226 (1998)).

The solid electrolyte may be formed from multiple layers, such as inner and/or outer layers. The term "inner" in this context refers to one or more layers such as generally shown by reference character 83, that overly the dielectric, whether directly or via another layer (e.g., pre-coat layer, such as generally shown by reference character 81). The inner layer(s), for example, typically contain an intrinsically conductive polymer such as described above. In one particular embodiment, the inner layer(s) are generally free of extrinsically conductive polymers and thus formed primarily from intrinsically conductive polymers. More particularly, intrinsically conductive polymers may constitute about 50 wt. % or more, in some embodiments about 70 wt. % or more, and in some embodiments, about 90 wt. % or more (e.g., 100 wt. %) of the inner layer(s). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may be applied in the form of a solution containing a solvent. The concentration of the polymer may vary depending on the desired viscosity of and the particular manner in which the layer is to be applied to the anode. Typically, however, the polymer constitutes from about 0.1 to about 10 wt. %, in some embodiments from about 0.4 to about 5 wt. %, and in some embodiments, from about 0.5 to about 4 wt. % of the solution. Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the solution. While other solvents may certainly be employed, it is generally desired that water is the primary solvent such that the solution is considered an "aqueous" solution. In most embodiments, for example, water constitutes at least about 50 wt. %, in some embodiments at least about 75 wt. %, and in some embodiments, from about 90 wt. % to 100 wt. % of the solvent(s) employed. When employed, a solution may be applied to the anode using any known technique, such as dipping, casting (e.g., curtain coating, spin coating, etc.), printing (e.g., gravure printing, offset printing, screen printing, etc.), and so forth. The resulting conductive polymer layer may be dried and/or washed after it is applied to the anode.

The solid electrolyte may contain only "inner layers" so that it is essentially formed from the same material, i.e., intrinsically conductive polymers. Nevertheless, in other embodiments, the solid electrolyte may also contain one or more optional "outer" conductive polymer layers, such as generally shown by reference character 85, that are formed from a different material than the inner layer(s) and overly the inner layer(s). For example, the outer layer(s) may be formed from an extrinsically conductive polymer. In one particular embodiment, the outer layer(s) are formed primarily from such extrinsically conductive polymers in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers.

When employed, it may be desirable that the extrinsically conductive polymer is applied in the form of a dispersion of pre-polymerized conductive particles. Such particles typically have an average size (e.g., diameter) of from about 1 to about 100 nanometers, in some embodiments from about 2 to about 80 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor element. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas.

If desired, the solid electrolyte may also contain an external polymer coating that overlies the inner and/or outer layer(s) described above. The external polymer coating typically contains one or more layers formed from conductive polymer particles, such as described above (e.g., formed from an extrinsically conductive polymer). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional particles employed in the solid electrolyte (e.g., in the outer layer(s)). For example, the ratio of the average size of the particles employed in the external polymer coating to the average size of any particles employed in the solid electrolyte is typically from about 1.5 to about 30, in some embodiments from about 2 to about 20, and in some embodiments, from about 5 to about 15. For example, the particles employed in the external coating may have an average size of from about 50 to about 800 nanometers, in some embodiments from about 80 to about 600 nanometers, and in some embodiments, from about 100 to about 500 nanometers.

A crosslinking agent may be optionally employed in the external polymer coating to further enhance the degree of adhesion. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof. The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

E. Moisture Barrier

As indicated above, a moisture barrier is employed in the capacitor element that overlies at least one conductive polymer layer in the solid electrolyte. In one embodiment, for example, the moisture barrier may constitute a portion of the solid electrolyte and overly one or more inner conductive polymer layers. In such embodiments, the moisture barrier may optionally be positioned between the inner conductive polymer layer(s) and any outer conductive polymer layer(s), or it may simply overly the inner conductive polymer layer(s), outer conductive polymer layer(s), and/or external polymer coating. In other embodiments, the moisture barrier may overly the entire solid electrolyte. Regardless, the moisture barrier includes a conjugated polymer that has a relatively high specific conductivity and low degree of water adsorption. In one particular embodiment, for example, the moisture barrier contains a polymer having repeating thiophene units of the containing repeating thiophene units of the following general formula (1) and/or (2):

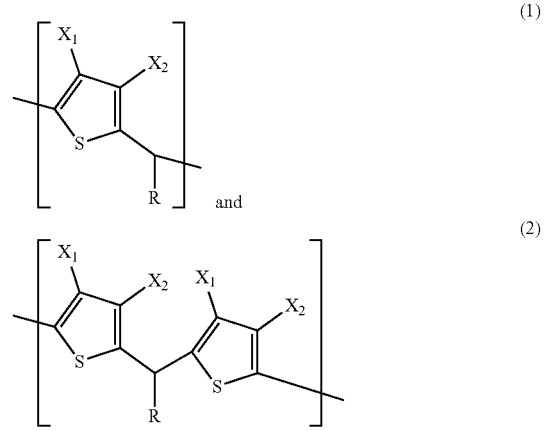

wherein, $X_1$ and $X_2$ are independently hydrogen, an optionally substituted alkyl (e.g., alkyl having 1 to 12 carbon atoms), optionally substituted alkoxy (e.g., alkoxy having 1 to 12 carbon atoms), optionally substituted alkylene oxide (e.g., having 1 to 12 carbon atoms), optionally substituted thiocyano, optionally substituted thioalkyl, or optionally substituted amino, or wherein $X_1$ and $X_2$ are combined to form an optionally substituted alkylenedioxy (e.g., having 1 to 12 carbon atoms) or an optionally substituted alkylenedithio group (e.g., having 1 to 12 carbon atoms); and R is an optionally substituted alkyl (e.g., alkyl having 1 to 12 carbon atoms), optionally substituted alkoxy (e.g., alkoxy having 1 to 12 carbon atoms), optionally substituted alkylene oxide (e.g., having 1 to 12 carbon atoms), optionally substituted heterocyclic group, or an optionally substituted aryl group (e.g., phenyl, naphthyl, etc.).

In one particular embodiment, $X_1$ and $X_2$ in Formula (1) and/or Formula (2) may be combined to form the following structure:

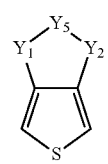

wherein, $Y_1$ and $Y_2$ are independently O or S; and $X_5$ is an alkylene group having 1 to 12 carbon atoms, optionally having a substituent and/or an oxygen analog, nitrogen analog, or sulfur analog structure within the alkylene group. In one embodiment, for instance, $X_5$ may be ethylene.

Suitable alkyl groups for R may include, for instance, methyl, ethyl, propyl, butyl, pentyl groups, and so forth. Suitable heterocyclic groups for R may include silole, furan, thiophene, oxazole, pyrrole, pyridine, pyridazine, pyrimidine, pyrazine, triazine, oxadiazole, triazole, imidazole, pyrazole, thiazole, indole, benzimidazole, benzothiazole, benzoxazole, quinoxaline, quinazoline, phthalazine, thienothiophene, carbazole, azacarbazole, dibenzosilole, dibenzofuran, dibenzothiophene, benzothiophene, benzodifuran, benzodithiophene, acridine, benzoquinoline, phenazine, phenanthridine, phenanthroline, cyclazine, kindrin, tepenidine, quinindrine, triphenodithiazine, triphenodioxazine, phenanthrazine, anthrazine, perimidine, naphthofuran, naphtho thiophene, naphthodifuran, naphthodithiophene, anthrafuran, anthradifuran, anthrathiophene, anthradithiophene, thianthrene, phenoxathiin, dibenzocarbazole, indolocarbazole, dithienobenzene, epoxy, aziridine, thiirane, oxetane, azetidine, thietane, tetrahydrofuran, dioxolane, pyrrolidine, pyrazolidine, imidazolidine, oxazolidine, tetrahydrothiophene, sulfolane, thiazolidine, e-caprolactone, e-caprolactam, piperidine, hexahydropyridazine, hexahydropyrimidine, piperazine, morpholine, tetrahydropyran, 1,3-dioxane, 1,4-dioxane, trioxane, tetrahydrothiopyran, thiomorpholine, thiomorpholine-1,1-dioxide, pyranose, diazabicyclo [2,2,2]-octane, phenoxazine, thioxanthene groups, and so forth. Suitable aryl groups for R may include, for instance, benzene (e.g., benzene, 2,4,6-trimethylbenzene, 2,6-dichlorobenzene, etc.), naphthalene, azulene, anthracene, phenanthrene, pyrene, triphenylene, fluorene groups, and so forth.

The number of repeating units ("n") may vary, such as 2 or more, in some embodiments 10 or more, and in some embodiments, from 20 to 300. Further, a counterion ("A") may also be present that is derived from the monomeric and/or polymeric compounds described above with respect to Formula (I). Particularly suitable counterions may be derived from polystyrene sulfonic acid, poly-2-sulfoethyl (meth)acrylate, poly-3-propylsulfo(meth)acrylate, p-toluenesulfonic acid, dodecylsulfonic acid, dodecylbenzenesulfonic acid, di(2-ethylhexyl) sulfosuccinic acid, polyoxyethylene polycyclic phenyl ether sulfonate, polyoxyethylene aryl ether sulfate, tetrafluoroboric acid, trifluoroacetic acid, hexafluorophosphoric acid, trifluoromethanesulfonimide, etc., as well as salts thereof, such as an alkali metal, alkaline earth metal, transition metal, or ammonium salt thereof.

In one particular embodiment, for example, the polymer may have repeating thiophene units of the containing repeating thiophene units of the following general formula (1) and/or (2):

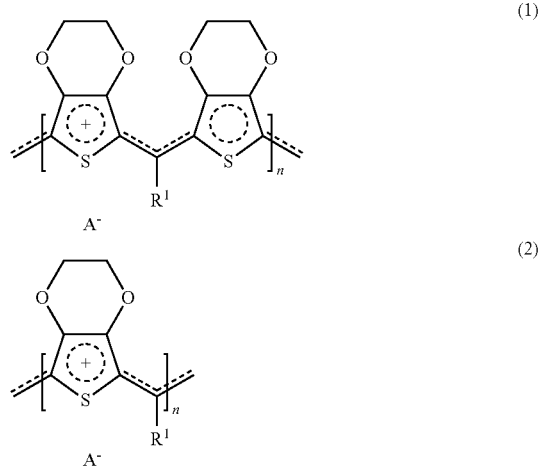

wherein, $R^1$ is an optionally substituted alkyl (e.g., alkyl having 1 to 12 carbon atoms), optionally substituted alkoxy (e.g., alkoxy having 1 to 12 carbon atoms), optionally substituted alkylene oxide (e.g., having 1 to 12 carbon atoms), optionally substituted heterocyclic group, or an optionally substituted aryl group (e.g., phenyl, naphthyl, etc.);

$A^-$ is a counterion, such as described above; and n is 2 or more, in some embodiments 10 or more, and in some embodiments, from 20 to 300.

The polymer may be formed through a variety of techniques as would be understood by those skilled in the art, such as described in U.S. Patent Publication No. 2018/0244838 and 2020/0118766, which are incorporated herein in its entirety by reference thereto. In one particular embodiment, for example, a thiophene polymer having the general formula (1) and/or (2) may be polymerized through the reaction of a thiophene monomer (e.g., 3,4-ethylenedioxythiophene) and an aldehyde derivative. Suitable aldehyde derivatives include, for instance, aromatic aldehydes (e.g., benzaldehyde, sodium 2-sulfobenzaldehyde, etc.), aliphatic aldehydes, and so forth. To initiate the reaction, a solvent and the compound from which the counterion $A^-$ is derived (e.g., acid) may be added to the polymerization mixture. Suitable solvents may include water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. The reaction typically occurs in the presence of an oxidizing agent, which may be part of the compound used to form the counterion or a separate oxidizing agent. Suitable oxidizing agents may include, for instance, a peroxide (e.g., ammonium peroxodisulfate (APS), sodium persulfate and potassium persulfate), hydrogen peroxide, quinone (e.g., p-benzoquinone and chloranil), iron (III) chloride, iron (III) sulfate, iron (III) hydroxide, iron (III) tetrafluoroborate, iron (III) hexafluorophosphate, copper (II) sulfate, copper (II) chloride, copper (II) tetrafluoroborate and copper (II) hexafluorophosphate, and so forth.

Regardless of how it is formed, the resulting polymer may have either a single structure or a mixed structure of a structural unit represented by the chemical formula (1) and a structural unit represented by the chemical formula (2) as noted above. If desired, the proportion of the structural unit represented by the chemical formula (2) can be increased by increasing an amount of the thiophene compound relative to the aldehyde derivative. The resulting polymer may be generally soluble in water, which enables it to be more easily and effectively applied to the anode. The soluble polymer is also able to more readily impregnate the small pores formed by the high specific charge powder, so that the resulting solid electrolyte has a "film-like" configuration and coats at least a portion of the anode in a substantially uniform manner. This improves the quality of the resulting oxide as well as its surface coverage, and thereby enhances the electrical properties of the capacitor.

The moisture barrier may be applied to any surface of the capacitor element to provide the desired properties. For example, the moisture barrier may be located on the top, bottom, and/or side surfaces of the capacitor element. The moisture barrier may likewise be located on the front and/or rear surface of the capacitor element. The moisture barrier may cover the entire area or only a portion of the area of the surface to which it is applied. In one embodiment, for example, the moisture barrier covers about 30% or more, in some embodiments about 40% or more, and in some embodiments, about 50% or more of a surface of the capacitor element to which it is applied.

Referring to FIG. 1, for example, one embodiment of a capacitor 30 is shown that contains a capacitor element 33 having a generally rectangular shape and contains a front surface 36, rear surface 38, top surface 37, bottom surface 39, first side surface 32, and second side surface (not shown). In the illustrated embodiment, an anode lead 16 is embedded within an anode body 40 and extends from the front surface 36 of the capacitor element 33 in a longitudinal direction. The capacitor element 33 contains a dielectric 44 that overlies the anode body 40 and a solid electrolyte 46 that overlies that dielectric 44. As shown, the solid electrolyte 46 is typically present at each surface of the capacitor 30 except for the front surface 36. Of course, it should be understood that such layers may be applied to any surface of the capacitor, and need not be applied in the manner illustrated. The capacitor element 33 also contains a moisture barrier 63 that include conductive polymer as noted above. In this particular embodiment, the moisture barrier 63 overlies the solid electrolyte 46 at the rear surface 38, top surface 37, as well as the side surfaces (not shown). The moisture barrier 63 is also present at the front surface 36, although it may not necessarily overly the solid electrolyte at this surface as noted above. Of course, it should be understood that the moisture barrier 63 need not be located on the surfaces of the capacitor element 33 as shown in FIG. 1. In another embodiment, for example, the moisture barrier may be located only at the side surfaces of the capacitor element 33. Regardless of the where it is located, the moisture barrier may cover any desired portion of the surface. For example, the moisture barrier may cover substantially all of the surfaces on which they are located, such as about 90% or more, and in some embodiments, about 95% or more. Once again, however, this is merely optional and the moisture barrier need not cover such a substantial portion of the surface.

F. Cathode Coating

If desired, the capacitor element may also employ a cathode coating that overlies the solid electrolyte and moisture barrier. The cathode coating may contain a metal particle layer includes a plurality of conductive metal particles dispersed within a polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

G. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may also be employed that overlies the dielectric and includes an organometallic compound.

II. Terminations

Once formed, the capacitor element may be provided with terminations, particularly when employed in surface mounting applications. For example, the capacitor may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and compound (e.g., silane compounds). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

Referring again to FIG. 1, for example, the electrolytic capacitor 30 is shown as including an anode termination 62 and a cathode termination 72 in electrical connection with the capacitor element 33. Although it may be in electrical contact with any of the surfaces of the capacitor element 33, the cathode termination 72 in the illustrated embodiment is in electrical contact with the lower surface 39 via a conductive adhesive 90. More specifically, the cathode termination 72 contains a first component 73 that is in electrical contact and generally parallel with the lower surface 39 of the capacitor element 33. The anode termination 62 likewise contains a first component 61 positioned substantially perpendicular to a second component 64. The first component 61 is in electrical contact and generally parallel with the lower surface 39 of the capacitor element 33. The second component 64 contains a region 51 that carries an anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, the conductive adhesive 90 may initially be applied to a surface of the cathode termination 72. The conductive adhesive 90 may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 is initially bent upward to the position shown in FIG. 1. Thereafter, the capacitor element 33 is positioned on the cathode termination 72 so that its lower surface 39 contacts the adhesive 90 and the anode lead 16 is received by the region 51. If desired, an insulating material (not shown), such as a plastic pad or tape, may be positioned between the lower surface 39 of the capacitor element 33 and the first component 61 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consists of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

III. Casino

The capacitor element is generally encapsulated within a casing so that at least a portion of the anode and cathode terminations are exposed for mounting onto a circuit board. As shown in FIG. 1, for instance, the capacitor element 33 is encapsulated within a casing 92 so that a portion of the anode termination 62 and a portion of the cathode termination 72 are exposed. The casing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Dissipation Factor

The dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Capacitance:

To determine capacitance (wet), samples may be immersed completely into an aqueous solution of phosphoric acid with a conductivity 8,600 µS/cm. The capacitance may then be measured using an Autolab 85429 with 0.5 volt DC bias and a 0.3 volt peak to peak sinusoidal signal. The operating frequency may be 0.5 Hz and the temperature may be 23° C.±2° C. To determine capacitance (dry), the samples may be dried at 125° C. for at least 24 hours, and then the capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C. "Capacitance recovery" may be determined by the equation:

Recovery (%)=(Dry Capacitance/Wet Capacitance)×100

Leakage Current

Leakage current may be measured using a leakage test meter at a temperature of 23° C.±2° C. and at the rated voltage after a minimum of 60 seconds.

Humidity Uptake:

Five (5) samples of may be dried at 125° C. for at least 48 hours to remove any traces of water inside. Thereafter, the samples may be inserted into an atmosphere having a temperature of 30° C. and relative humdity of 60% for 168 hours. After the exposure to humidity, samples may be analyzed on a TGA analyzer (e.g., TA Instruments, TGA 550) to evaluate weight loss and thus the amount of water soaked into the samples during humidity exposure. The TGA procedure involves a temperature ramp up from room temperature to 125° C. at a rate of 10° C./min, and then constant drying at 125° C. for 12 hours. The weight loss may be evaluated at the end of drying procedure and used to determine the water content for each sample.

EXAMPLE 1

40,000 µFV/g tantalum powder was used to form anode samples. Each anode sample was embedded with a tantalum wire, pressed to a density of 5.3 g/cm$^3$ and sintered at 1380° C. The pressed pellets had a size of 5.60×3.65×0.80 mm. The pellets were anodized to 86.0 volts in water/phosphoric acid electrolyte with a conductivity of 8.6 mS at a temperature of 40° C. to form the dielectric layer. The pellets were anodized again to 150 volts in a water/boric acid/disodium tetraborate with a conductivity of 2.0 mS at a temperature of 30° C. for 8 seconds to form a thicker oxide layer built up on the outside. A conductive polymer coating was formed by dipping the anodes into a solution of poly(4-(2,3-dihydrothieno-[3,4-b][1,4]dioxin-2-ylmethoxy)-1-butane-sulphonic acid having a solids content of 2.0%. Upon coating, the parts were dried at 125° C. for 15 minutes. This process was repeated 6 times. Thereafter, the parts were dipped into a dispersed poly(3,4-ethylenedioxythiophene) having a solids content 2.0% and viscosity 20 mPa·s (Clevios™ K, Heraeus). Upon coating, the parts were dried at 125° C. for 15 minutes. This process was repeated 3 times. Thereafter, the parts were dipped into a dispersed poly(3,4-ethylenedioxythiophene) having a solids content of 2% and viscosity 160 mPa·s (Clevios™ K, Heraeus). Upon coating, the parts were dried at 125° C. for 15 minutes. This process was repeated 14 times. The parts were then dipped into a graphite dispersion and dried. Finally, the parts were dipped into a silver dispersion and dried. Multiple parts (270) of 47 µF/35V capacitors were made in this manner and encapsulated in a silica resin.

EXAMPLE 2

Capacitors were formed in the manner described in Example 1, except that a moisture barrier was employed over the solid electrolyte. More particularly, after all conductive polymer coatings described in Example 1, the parts were dipped into a dispersion containing a thiophene polymer having repeating units (1) and/or (2) as described herein. Upon coating, the parts were dried at 150° C. for 60 minutes. This process was repeated 4 times. The parts were then dipped into a graphite dispersion and dried. Finally, the parts were dipped into a silver dispersion and dried. Multiple parts (360) of 47 µF/35V capacitors were made in this manner and encapsulated in a silica resin.

EXAMPLE 3

Capacitors were formed in the manner described in Example 1, except that a moisture barrier was employed over the solid electrolyte. More particularly, after all conductive polymer coatings described in Example 1, the parts were dipped into a dispersion containing a thiophene polymer having repeating units (1) and/or (2) as described herein. except that an additional conductive polymer coating was used. Upon coating, the parts were dried at 150° C. for 60 minutes. This process was repeated 6 times. The parts were then dipped into a graphite dispersion and dried. Finally, the parts were dipped into a silver dispersion and dried. Multiple parts (360) of 47 μF/35V capacitors were made in this manner and encapsulated in a silica resin.

Finished parts were submitted to humidity uptake test. The average results of the water content measured by TGA are set forth below in Table 1.

TABLE 1

Weight of Water Soaked in a Capacitor

| | # of Moisture Barrier Layers | Water Weight (μg/unit) | Water Weight (ppm) |
|---|---|---|---|
| Example 1 | 0 | 176.0 | 950 |
| Example 2 | 4 | 128.7 | 695 |
| Example 3 | 6 | 113.3 | 611 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising a capacitor element, wherein the capacitor element comprises:
   a sintered porous anode body;
   a dielectric that overlies the anode body;
   a solid electrolyte that overlies the dielectric,
      wherein the solid electrolyte includes a conductive polymer layer and contains an inner layer and an outer layer, wherein the outer layer is different from the inner layer,
      wherein the inner layer contains an intrinsically conductive polymer having repeating units of the following formula (II):

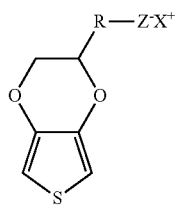

(II)

wherein,
   R is $(CH_2)_a$—O—$(CH_2)_b$-L, where L is a bond or $HC([CH_2]_cH)$;
   a is from 0 to 10;
   b is from 1 to 18;
   c is from 0 to 10;
   Z is an anion;
   X is a cation; and a moisture barrier that overlies the conductive polymer layer,
   wherein the moisture barrier contains a conjugated polymer having a specific conductivity of about 0.1 S/cm or more, and further wherein after exposure to an atmosphere having a relative humidity of 60% and a temperature of 30° C. for 168 hours, the capacitor element absorbs only about 900 ppm of water or less,
   wherein the conjugated polymer contains repeating thiophene units of the following general formula (1) and/or (2):

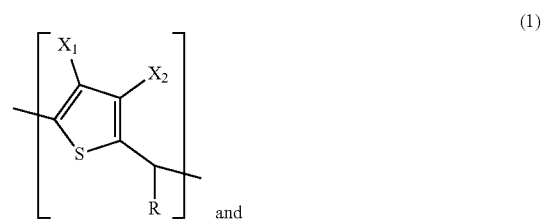

(1)

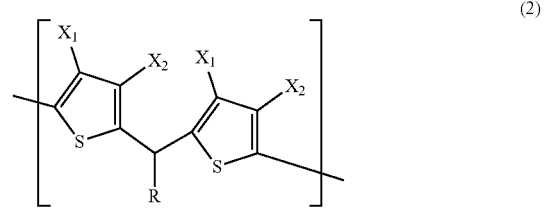

(2)

wherein $X_1$ and $X_2$ are independently hydrogen, an optionally substituted alkyl, optionally substituted alkoxy, optionally substituted alkylene oxide, optionally substituted thiocyano, optionally substituted thioalkyl, or optionally substituted amino, or wherein $X_1$ and $X_2$ are combined to form an optionally substituted alkylenedioxy or an optionally substituted alkylenedithio group and $R_1$ is an optionally substituted alkyl, optionally substituted alkoxy, optionally substituted alkylene oxide, optionally substituted heterocyclic group, or an optionally substituted aryl group, and wherein $X_1$ and $X_2$ in formula (1) and/or formula (2) are combined to form the following structure:

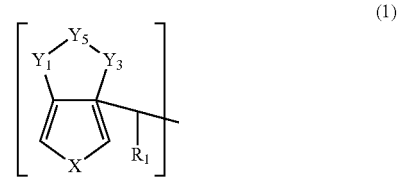

(1)

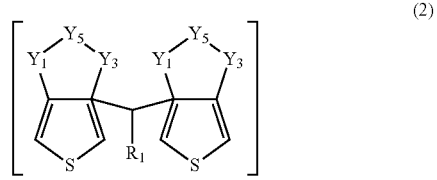

(2)

wherein, $Y_1$ and $Y_2$ are independently O or S and $X_5$ is an alkylene group having 1 to 12 carbon atoms, optionally having a substituent and/or an oxygen analog, nitrogen analog, or sulfur analog structure within the alkylene group.

2. The solid electrolytic capacitor of claim 1, wherein $Y_1$ and $Y_2$ are O.

3. The solid electrolytic capacitor of claim 1, wherein $X_5$ is ethylene.

4. A The solid electrolytic capacitor of claim 1, wherein $R_1$ is an alkyl group.

5. The solid electrolytic capacitor of claim 1, wherein $R_1$ is benzene, 2,4,6-trimethylbenzene, 2,6-dichlorobenzene, or a combination thereof.

6. The solid electrolytic capacitor of claim 1, wherein the moisture barrier overlies the solid electrolyte.

7. The solid electrolytic capacitor of claim 1, wherein the moisture barrier is positioned between the inner layer and the outer layer.

8. The solid electrolytic capacitor of claim 1, wherein the moisture barrier overlies the inner layer and the outer layer.

9. The solid electrolytic capacitor of claim 1, wherein the outer layer is formed from particles that contain a polymeric counterion and an extrinsically conductive polymer.

10. The solid electrolytic capacitor of claim 9, wherein the extrinsically conductive polymer includes poly(3,4-ethylenedioxythiophene).

11. The solid electrolytic capacitor of claim 9, wherein the polymeric counterion includes polystyrene sulfonic acid.

12. The solid electrolytic capacitor of claim 1, further comprising an anode lead extending from the capacitor element.

13. The solid electrolytic capacitor of claim 1, further comprising an anode termination that is in electrical contact with the anode lead and a cathode termination that is in electrical connection with the solid electrolyte.

14. The solid electrolytic capacitor of claim 1, further comprising a housing within which the capacitor element is enclosed.

15. The solid electrolytic capacitor of claim 1, wherein the anode body includes tantalum.

16. The solid electrolytic capacitor of claim 1, wherein the capacitor element further comprises a cathode coating that contains a metal particle layer that overlies the solid electrolyte and the moisture barrier, wherein the metal particle layer includes a plurality of conductive metal particles.

17. The solid electrolytic capacitor of claim 1, wherein the capacitor element further comprises a pre-coat positioned between the dielectric and the conductive polymer layer, the pre-coating comprising an organometallic compound.

18. A solid electrolytic capacitor comprising a capacitor element, wherein the capacitor element comprises:

a sintered porous anode body;

a dielectric that overlies the anode body;

a solid electrolyte that overlies the dielectric, wherein the solid electrolyte includes a conductive polymer layer and contains an inner layer and an outer layer, wherein the outer layer is different from the inner layer, wherein the inner layer contains an intrinsically conductive polymer having repeating units of the following formula (II):

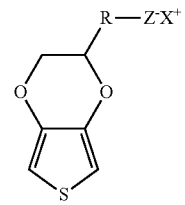

wherein,

R is $(CH_2)_a$—O—$(CH_2)_b$-L, where L is a bond or $HC([CH_2]_cH)$;

a is from 0 to 10;

b is from 1 to 18;

c is from 0 to 10;

Z is an anion;

X is a cation; and a moisture barrier that overlies the conductive polymer layer, wherein the moisture barrier contains a conjugated polymer having a specific conductivity of about 0.1 S/cm or more and that contains repeating thiophene units of the following general formula (1) and/or (2):

wherein the conjugated polymer contains repeating thiophene units of the following general formula (1) and/or (2):

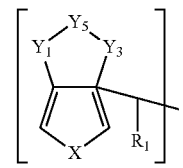

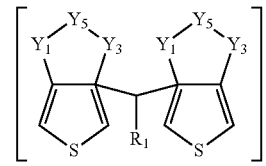

wherein, $X_1$ and $X_2$ are independently hydrogen, an optionally substituted alkyl, optionally substituted alkoxy, optionally substituted alkylene oxide, optionally substituted thiocyano, optionally substituted thioalkyl, or optionally substituted amino, or wherein $X_1$ and $X_2$ are combined to form an optionally substituted alkylenedioxy or an optionally substituted alkylenedithio group; and $R_1$ is an optionally substituted alkyl, optionally substituted alkoxy, optionally substituted alkylene oxide, optionally substituted heterocyclic group, or an optionally substituted aryl group, wherein $X_1$ and $X_2$ in formula (1) and/or formula (2) are combined to form the following structure:

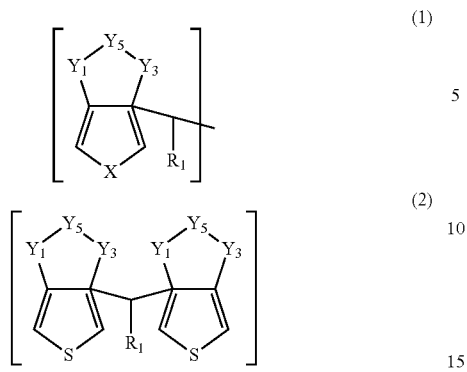

wherein, $Y_1$ and $Y_2$ are independently O or S; and $X_5$ is an alkylene group having 1 to 12 carbon atoms, optionally having a substituent and/or an oxygen analog, nitrogen analog, or sulfur analog structure within the alkylene group.

19. The solid electrolytic capacitor of claim 18, wherein $Y_1$ and $Y_2$ are O.

20. The solid electrolytic capacitor of claim 18, wherein $X_5$ is ethylene.

21. The solid electrolytic capacitor of claim 18, wherein $R_1$ is an alkyl group.

22. The solid electrolytic capacitor of claim 18, wherein $R_1$ is benzene, 2,4,6-trimethylbenzene, 2,6-dichlorobenzene, or a combination thereof.

* * * * *